US009909010B2

(12) United States Patent
Schmidt

(10) Patent No.: US 9,909,010 B2
(45) Date of Patent: Mar. 6, 2018

(54) PIGMENTS

(71) Applicant: Merck Patent GmbH, Darmstadt (DE)

(72) Inventor: Christoph Schmidt, Kriftel (DE)

(73) Assignee: Merck Patent GmbH, Darmstadt (DE)

( * ) Notice: Subject to any disclaimer, the term of this patent is extended or adjusted under 35 U.S.C. 154(b) by 135 days.

(21) Appl. No.: 14/653,432

(22) PCT Filed: Dec. 9, 2013

(86) PCT No.: PCT/EP2013/003702
§ 371 (c)(1),
(2) Date: Jun. 18, 2015

(87) PCT Pub. No.: WO2014/094993
PCT Pub. Date: Jun. 26, 2014

(65) Prior Publication Data
US 2016/0185972 A1    Jun. 30, 2016

(30) Foreign Application Priority Data
Dec. 20, 2012    (DE) .......... 10 2012 024 901

(51) Int. Cl.
*C09D 11/037* (2014.01)
*C09D 7/12* (2006.01)
*C09D 17/00* (2006.01)
*C09C 1/00* (2006.01)

(52) U.S. Cl.
CPC .......... *C09C 1/0015* (2013.01); *C09D 7/1291* (2013.01); *C09D 11/037* (2013.01); *C09D 17/00* (2013.01); *C01P 2004/61* (2013.01); *C09C 2200/10* (2013.01); *C09C 2200/102* (2013.01); *C09C 2200/1004* (2013.01); *C09C 2200/305* (2013.01); *C09C 2200/308* (2013.01); *C09C 2200/40* (2013.01); *C09C 2200/401* (2013.01); *C09C 2200/402* (2013.01); *C09C 2200/407* (2013.01)

(58) Field of Classification Search
CPC .... C09D 11/037; C09D 7/1291; C09D 17/00; C09C 1/0015; C09C 2200/10; C09C 2200/1004; C09C 2200/102; C09C 2200/305; C09C 2200/208; C09C 2200/40; C09C 2200/401; C09C 2200/402; C09C 2200/407; C01P 2006/61
USPC ...................................... 106/31.65
See application file for complete search history.

(56) References Cited

U.S. PATENT DOCUMENTS

| | | | |
|---|---|---|---|
| 1,533,430 A | 4/1925 | Konerman et al. | |
| 3,951,679 A | 4/1976 | Bernhard et al. | |
| 5,009,711 A | 4/1991 | Emmert et al. | |
| 6,596,070 B1 * | 7/2003 | Schmidt .................. | A61Q 1/02 106/415 |
| 6,599,355 B1 | 7/2003 | Schmidt et al. | |
| 6,692,561 B1 * | 2/2004 | Schoen .................... | C09D 5/36 106/417 |
| 6,884,289 B2 * | 4/2005 | Schoen .................. | C09C 1/0036 106/415 |
| 8,771,717 B2 | 7/2014 | Bujard et al. | |
| 2004/0052743 A1 * | 3/2004 | Schmidt .................. | A61K 8/11 424/63 |
| 2010/0322981 A1 | 12/2010 | Bujard et al. | |
| 2011/0269845 A1 | 11/2011 | Bujard et al. | |
| 2013/0164356 A1 | 6/2013 | Pfaff et al. | |

FOREIGN PATENT DOCUMENTS

| | | |
|---|---|---|
| CN | 1384858 A | 12/2002 |
| CN | 101289580 A | 10/2008 |
| CN | 101970581 A | 2/2011 |
| CN | 102245715 A | 11/2011 |
| CN | 102660157 A | 9/2012 |
| EP | 2607432 A1 | 6/2013 |
| GB | 1533430 A | 11/1978 |
| JP | 51-143027 A | 12/1976 |
| JP | 1-101377 A | 4/1989 |
| JP | 2003-513140 A | 4/2003 |
| JP | 2011-504193 A | 2/2011 |
| JP | 2012-511598 A | 5/2012 |
| WO | 2009/062886 A1 | 5/2009 |

OTHER PUBLICATIONS

English translation of CN 101289580, Oct. 2008; 9 pages.*
Chinese Office Action dated Jul. 19, 2016 issued in corresponding CN 201380066304.1 application (12 pages).
English Abstract of CN 102245715 A published Nov. 16, 2011 (1 page).
English Abstract of CN 102660157 A published Sep. 12, 2012 (1 page).
English Abstract of CN 101970581 A published Feb. 9, 2011 (1 page).
International Search Report dated Jan. 28, 2014 issued in corresponding PCT/EP2013/003702 application (pp. 1-2).
JP Office Action dated Jun. 20, 2017 issued in corresponding JP 2015-548270 application (4 pages).

* cited by examiner

*Primary Examiner* — Helene Klemanski
(74) *Attorney, Agent, or Firm* — Millen White Zelano and Branigan, PC

(57) ABSTRACT

The present invention relates to interference pigments based on multicoated flake-form substrates which have on the surface of the substrate a layer sequence comprising (A0) optionally a high-refractive-index coating consisting of a layer of $TiO_2$, (A) a high-refractive-index coating consisting of a mixture of $TiO_2$ and $Fe_2O_3$, which may optionally be doped with one or more further oxides, (B) a high-refractive-index layer consisting of $SnO_2$, (C) a high-refractive-index coating which absorbs in the visible wavelength region, and optionally (D) an outer protective layer, and to the use thereof, in particular in paints, coatings, industrial coatings, automobile paints, automotive refinish paints, coil coating, powder coatings, printing inks, plastics, pigment pastes, pigment preparations and in dry preparations, such as, for example, granules.

15 Claims, No Drawings

PIGMENTS

The present invention relates to interference pigments based on multicoated flake-form substrates.

Lustre or effect pigments are employed in many areas of industry, in particular in the area of automobile paints, decorative coating, in plastic, in paints, printing inks and in cosmetic formulations.

Interference pigments are based on flake-form particles having an internal layer structure. The thicknesses of the layers are in the order of magnitude of visible light, so that interference phenomena which cause the intense lustre or the colours occur on the layers. The pigment particles generally consist of a flake-form central support which is covered with one or more oxide layers. The covering with a plurality of oxide layers results in so-called multilayered pigments, which are distinguished by particular effects, such as, for example, particularly high angle dependence of the hue and/or intense colours.

Typical multilayered pigments of this type consist of an alternating sequence of oxides having different refractive indices which are applied to the substrate.

Examples which may be mentioned here are the products described in WO 98/53011 and WO 99/20695. A specific embodiment having an $SnO_2$ interlayer is described in CN101289580 A. The latter describes the preparation of a gold-coloured interference pigment by covering mica with four successive layers of $TiO_2$, $TiO_2/Fe_2O_3$, $SnO_2$ and $TiO_2$.

However, the gold pigments based on mica flakes which are known from CN101289580 A have the disadvantage that they have a relatively low chroma $C^*$ for a multilayered pigment.

The object of the present invention is therefore to provide intensely coloured interference pigments having high chroma and high lustre which are distinguished by their advantageous applicational properties and at the same time can be prepared in a simple manner.

Surprisingly, interference pigments based on flake-form substrates having at least two layers which absorb in the visible wavelength region whose colour intensity (chroma) extends significantly beyond the interference-type pigments known from the prior art have now been found.

The present invention relates to interference pigments based on multicoated flake-form substrates which have on the surface of the substrate a layer sequence comprising
(A0) optionally a high-refractive-index coating consisting of a layer of $TiO_2$,
(A) a high-refractive-index coating consisting of a mixture of $TiO_2$ and $Fe_2O_3$, which may optionally be doped with one or more further oxides,
(B) a high-refractive-index layer consisting of $SnO_2$,
(C) a high-refractive-index coating which absorbs in the visible wavelength region,
and optionally
(D) an outer protective layer.

The multilayered pigments according to the invention are distinguished over the interference pigments from the prior art by higher colour strength and exhibit intense and bright colours, in particular in the gold and red region.

The colour strength of the pigments according to the invention here is dependent, inter alia, on the particle size distribution. The smaller the particle size, the more opaque is the pigment according to the invention in the respective application, for example in an automobile paint, and the higher is the colour strength.

The pigments according to the invention are significantly superior to the multilayered pigments from the prior art not only with respect to their optical properties, such as gloss and colour strength, but also in their applicational properties, such as, for example, mechanical stability and photostability.

The invention furthermore relates to the use of the pigments according to the invention in paints, surface coatings, in particular automobile paints, automotive refinish paints, powder coatings, printing inks, security printing inks, plastics, ceramic materials, glasses, paper, in toners for electrophotographic printing processes, in seed, in greenhouse sheeting and tarpaulins, as absorbers in the laser marking of paper and plastics, and in cosmetic formulations. The pigments according to the invention are furthermore also suitable for the preparation of pigment pastes with water, organic and/or aqueous solvents, pigment compositions and for the preparation of dry preparations, such as, for example, granules, chips, pellets, briquettes, etc. The dry preparations are particularly suitable for printing inks and in cosmetics.

Suitable base substrates for the pigments according to the invention are colourless or selectively or non-selectively absorbent flake-form substrates. Suitable substrates are, in particular, phyllosilicates, such as natural or synthetic mica, talc, kaolin, flake-form iron or aluminium oxides, glass flakes, $SiO_2$ flakes, $TiO_2$ flakes, graphite flakes, synthetic support-free flakes, titanium nitride, titanium silicide, liquid crystal polymers (LCPs), holographic pigments, BiOCl and flake-form mixed oxides, or mixtures thereof. Particularly preferred substrates are glass flakes, natural or synthetic mica flakes and $Al_2O_3$ flakes.

The size of the base substrates is not crucial per se and can be matched to the particular application. In general, the flake-form substrates have a thickness of between 0.005 and 10 μm, in particular between 0.05 and 1 μm. The size in the two other dimensions is usually 1-500 μm, preferably 2-300 μm and in particular 20-200 μm. Preferred smaller particle sizes are furthermore those in the range 1-100 μm, in particular 5-60 μm, 5-40 μm and 1-15 μm.

Suitable base substrates are, in particular, synthetically prepared substrates. Particularly preferred synthetic substrates are glass flakes, mica flakes, $SiO_2$ flakes and $Al_2O_3$ flakes. $Al_2O_3$ flakes are especially preferred.

Suitable glasses for the synthetically prepared glass flakes are all glasses known to the person skilled in the art, for example silicate glasses, such as soda-lime glass, borosilicate glass, aluminosilicate glass, lead crystal glass, E, A, C or ECR glass, Duran glass, window glass, laboratory glass, etc. Glasses of this type are produced from sand, lime, clay, boron compounds, potash, soda, etc. and allowed to solidify in a shaped state. Suitable glass flakes preferably consist of C, E, ECR or borosilicate glass. It is of course also possible to employ mixtures of different glass flakes which only differ in the glass composition. Particular preference is given to substrate flakes comprising calcium aluminium borosilicate or ECR glass.

The glass flakes can be specifically coloured during production by addition of inorganic colorants. Suitable colorants are those which do not decompose at the melting point of the glass. The colorant is generally added to the glass melt in amounts of 0.1-50% by weight, in particular 0.2-25% by weight and very particularly preferably 0.5-10% by weight.

Suitable colorants are, in particular, the cations or complex anions of the elements Cu, Cr, Mn, Fe and Co and/or combinations thereof. Intense blue, green, yellow, orange or red colours can be obtained by addition of the ions. Suitable colorants are furthermore $TiO_2$ or elemental noble metals.

The refractive index of suitable glass flakes is preferably 1.45-1.80, in particular 1.50-1.70.

It is frequently advisable to provide the surface of the glass flakes with an $SiO_2$ layer before the covering with layers (A0)-(C) or (A)-(C). However, the covering with the $SiO_2$ layer (layer (S)) means that the chemical composition of the glass flakes is of secondary importance for the further coatings and the resultant applicational properties of the pigments. The $SiO_2$ covering protects the glass surface against chemical modification, such as swelling, leaching-out of glass constituents or dissolution in the aggressive acidic covering solutions.

Particular preference is given to glass flakes having an average thickness of <2 μm. Thicker flakes generally cannot be employed in common printing processes and in demanding paint finishes. The glass flakes preferably have average thicknesses of <1 μm, in particular <0.9 μm. Particular preference is given to glass flakes having thicknesses of 200-1000 nm. The diameter of the glass flakes is preferably 5-300 μm, particularly preferably 20-200 μm, 10-150 μm and 10-100 μm. Glass flakes having these dimensions are commercially available.

Particular preference is given to interference pigments based on $Al_2O_3$ flakes. The $Al_2O_3$ flakes preferably have the following particle size distributions:
$D_{10}$: 6-12
$D_{50}$: 15-23
$D_{90}$: 28-45.

The thickness of the $Al_2O_3$ flakes is preferably 50-500 nm. The form factor (diameter/thickness ratio) of the $Al_2O_3$ flakes is preferably 50-300.

The characterisation of the particle size distribution is carried out in this patent application by means of laser diffraction. In the present application, the particle size distribution is determined using the Malvern Mastersizer 2000 instrument.

The thickness of the individual layers having a high refractive index, for example $TiO_2$, $SnO_2$, $Fe_2O_3$, pseudobrookite, $TiO_2/Fe_2O_3$, on the base substrate is essential for the optical properties of the pigment. For a pigment having intense interference colours, the thickness of the individual layers must be adjusted accurately to one another. It has been found that the sum of all layers on the substrate should not exceed a thickness of ≤300 nm, preferably ≤250 nm.

The interference pigments according to the invention comprise at least three high-refractive-index layers (A)-(C). If the said substrates are covered with the layer (A0), the interference pigments according to the invention have four high-refractive-index layers. Thus, either layer (A0) or layer (A) is located as first layer on the surface of the substrate.

The high-refractive-index layer (A0) has a refractive index n≥2.0, preferably n≥2.1, and is a $TiO_2$ layer. The thickness of coating (A0) is preferably 1-100 nm, in particular 1-50 nm and very particularly preferably 1-30 nm.

Layer (A) consists of a mixture of $TiO_2$ and $Fe_2O_3$. The $TiO_2$ to $Fe_2O_3$ mixing ratio is preferably 10:1 to 1:3, in particular 3:1 to 1:3. The thickness of coating (A) is preferably 10-200 nm, in particular 15-180 nm and very particularly preferably 20-150 nm.

In order to increase the colour strength of layer (A) and/or of layer (C), it is frequently advisable to admix one or more oxides, such as, for example, $Al_2O_3$, $Ce_2O_3$, $B_2O_3$, $ZrO_2$, $SnO_2$, with the $TiO_2/Fe_2O_3$ mixture. The % by weight proportion of the further oxides besides the $Fe_2O_3/TiO_2$ mixture in layer (A) or layer (C) should be not more than 20% by weight, preferably not more than 10% by weight. A metal oxide, such as, for example, $Al_2O_3$, $ZrO_2$ or $SnO_2$, is preferably admixed.

Layer (B) consists of $SnO_2$ and preferably has layer thicknesses of 0.5-50 nm, in particular 1-30 nm and very particularly preferably 5-25 nm.

The high-refractive-index coating (C) has a refractive index n≥2.0, preferably n≥2.1, and may consist of one or more layers. Coating (C) is preferably
a $TiO_2$ layer followed by an $Fe_2O_3$ layer, or
an $Fe_2O_3$ layer, or
a layer consisting of a mixture of $TiO_2$ and $Fe_2O_3$ or
a $TiO_2$ layer followed by a layer of Carmine Red or
a $TiO_2$ layer followed by a layer of Berlin Blue.

In the case of a mixture of $TiO_2$ and $Fe_2O_3$, the $TiO_2$ to $Fe_2O_3$ mixing ratio is preferably 10:1 to 1:3, in particular 3:1 to 1:3. The thickness of coating (C) is preferably 10-200 nm, in particular 15-180 nm and very particularly preferably 20-150 nm.

The titanium dioxide in the high-refractive-index layer (A0) or, if present, in coating (C) can be in the rutile or anatase modification. The processes for the preparation of rutile are described in the prior art, for example in U.S. Pat. No. 5,433,779, U.S. Pat. No. 4,038,099, U.S. Pat. No. 6,626,989, DE 25 22 572 C2, EP 0 271 767 B1. A thin tin dioxide layer (<10 nm), which serves as additive in order to obtain the $TiO_2$ as rutile phase, is preferably applied to coated or uncoated substrate flakes before the $TiO_2$ precipitation. The thickness of layers (A0) to (C) or (A) to (C) depends on the desired interference colour.

Particularly preferred interference pigments have the following layer sequences on the flake-form substrate:
substrate+$TiO_2$+$TiO_2/Fe_2O_3$+$SnO_2$+$TiO_2/Fe_2O_3$
substrate+$TiO_2$+$TiO_2/Fe_2O_3$+$SnO_2$+$TiO_2$+$TiO_2/Fe_2O_3$
substrate+$TiO_2$+$TiO_2/Fe_2O_3$+$SnO_2$+$TiO_2$+$Fe_2O_3$
substrate+$TiO_2$+$TiO_2/Fe_2O_3$+$SnO_2$+$Fe_2O_3$
substrate+$TiO_2$+$TiO_2/Fe_2O_3$+$SnO_2$+$Fe_3O_4$
substrate+$TiO_2$+$TiO_2/Fe_2O_3$+$SnO_2$+$TiO_2$+Carmine Red
substrate+$TiO_2$+$TiO_2/Fe_2O_3$+$SnO_2$+$TiO_2$+Berlin Blue
substrate+$TiO_2/Fe_2O_3$+$SnO_2$+$TiO_2/Fe_2O_3$
substrate+$TiO_2/Fe_2O_3$+$SnO_2$+$TiO_2$+$TiO_2/Fe_2O_3$
substrate+$TiO_2/Fe_2O_3$+$SnO_2$+$TiO_2$+$Fe_2O_3$
substrate+$TiO_2/Fe_2O_3$+$SnO_2$+$Fe_2O_3$
substrate+$TiO_2/Fe_2O_3$+$SnO_2$+$Fe_3O_4$
substrate+$TiO_2/Fe_2O_3$+$SnO_2$+$TiO_2$+Carmine Red
substrate+$TiO_2/Fe_2O_3$+$SnO_2$+$TiO_2$+Berlin Blue.

The above-mentioned preferred interference pigments may optionally in each case also have a protective layer (D) as final layer.

Very particular preference is given to interference pigments having the following layer sequence:
substrate+$TiO_2/Fe_2O_3$+$SnO_2$+$TiO_2/Fe_2O_3$+optionally layer (D)
substrate+$TiO_2$+$TiO_2/Fe_2O_3$+$SnO_2$+$TiO_2/Fe_2O_3$+optionally layer (D)

The expression "$TiO_2/Fe_2O_3$" means that $TiO_2$ and $Fe_2O_3$ are applied in mixed form here. The $TiO_2$ to $Fe_2O_3$ mixing ratio is preferably 10:1 to 1:3, in particular 3:1 to 1:3.

If both layer (A) and also coating (C) each consist of a mixture of $TiO_2$ and $Fe_2O_3$, the composition of the $TiO_2/Fe_2O_3$ mixture may be identical or different.

Of the preferred multilayered pigments, the pigments based on $Al_2O_3$ flakes, furthermore on glass flakes, are particularly preferred. Very particularly preferred multilayered pigments of the present invention are mentioned below:
synthetic mica flakes+$TiO_2$+$TiO_2/Fe_2O_3$+$SnO_2$+$TiO_2$/ $Fe_2O_3$
synthetic mica flakes+$TiO_2$+$TiO_2/Fe_2O_3$+$SnO_2$+$TiO_2$+ $TiO_2/Fe_2O_3$ synthetic mica flakes+$TiO_2$+$TiO_2$/$Fe_2O_3$+$SnO_2$+$TiO_2$+$Fe_2O_3$
synthetic mica flakes+$TiO_2$+$TiO_2$/$Fe_2O_3$+$SnO_2$+$Fe_2O_3$
synthetic mica flakes+$TiO_2$/$Fe_2O_3$+$SnO_2$+$TiO_2$/$Fe_2O_3$
synthetic mica flakes+$TiO_2$/$Fe_2O_3$+$SnO_2$+$TiO_2$+$TiO_2$/$Fe_2O_3$
synthetic mica flakes+$TiO_2$/$Fe_2O_3$+$SnO_2$+$TiO_2$+$Fe_2O_3$
synthetic mica flakes+$TiO_2$/$Fe_2O_3$+$SnO_2$+$Fe_2O_3$
glass flakes+$TiO_2$+$TiO_2$/$Fe_2O_3$+$SnO_2$+$TiO_2$/$Fe_2O_3$
glass flakes+$TiO_2$+$TiO_2$/$Fe_2O_3$+$SnO_2$+$TiO_2$+$TiO_2$/$Fe_2O_3$
glass flakes+$TiO_2$+$TiO_2$/$Fe_2O_3$+$SnO_2$+$TiO_2$+$Fe_2O_3$
glass flakes+$TiO_2$+$TiO_2$/$Fe_2O_3$+$SnO_2$+$Fe_2O_3$
glass flakes+$TiO_2$/$Fe_2O_3$+$SnO_2$+$TiO_2$/$Fe_2O_3$
glass flakes+$TiO_2$/$Fe_2O_3$+$SnO_2$+$TiO_2$+$TiO_2$/$Fe_2O_3$
glass flakes+$TiO_2$/$Fe_2O_3$+$SnO_2$+$TiO_2$+$Fe_2O_3$
glass flakes+$TiO_2$/$Fe_2O_3$+$SnO_2$+$Fe_2O_3$
glass flakes+$SiO_2$+$TiO_2$+$TiO_2$/$Fe_2O_3$+$SnO_2$+$TiO_2$/$Fe_2O_3$
glass flakes+$SiO_2$+$TiO_2$+$TiO_2$/$Fe_2O_3$+$SnO_2$+$TiO_2$+$TiO_2$/$Fe_2O_3$
glass flakes+$SiO_2$+$TiO_2$+$TiO_2$/$Fe_2O_3$+$SnO_2$+$TiO_2$+$Fe_2O_3$
glass flakes+$SiO_2$+$TiO_2$+$TiO_2$/$Fe_2O_3$+$SnO_2$+$Fe_2O_3$
glass flakes+$SiO_2$+$TiO_2$/$Fe_2O_3$+$SnO_2$+$TiO_2$/$Fe_2O_3$
glass flakes+$SiO_2$+$TiO_2$/$Fe_2O_3$+$SnO_2$+$TiO_2$+$TiO_2$/$Fe_2O_3$
glass flakes+$SiO_2$+$TiO_2$/$Fe_2O_3$+$SnO_2$+$TiO_2$+$Fe_2O_3$
glass flakes+$SiO_2$+$TiO_2$/$Fe_2O_3$+$SnO_2$+$Fe_2O_3$
$Al_2O_3$ flakes+$TiO_2$+$TiO_2$/$Fe_2O_3$+$SnO_2$+$TiO_2$/$Fe_2O_3$
$Al_2O_3$ flakes+$TiO_2$+$TiO_2$/$Fe_2O_3$+$SnO_2$+$TiO_2$+$TiO_2$/$Fe_2O_3$
$Al_2O_3$ flakes+$TiO_2$+$TiO_2$/$Fe_2O_3$+$SnO_2$+$TiO_2$+$Fe_2O_3$
$Al_2O_3$ flakes+$TiO_2$+$TiO_2$/$Fe_2O_3$+$SnO_2$+$Fe_2O_3$
$Al_2O_3$ flakes+$TiO_2$/$Fe_2O_3$+$SnO_2$+$TiO_2$/$Fe_2O_3$
$Al_2O_3$ flakes+$TiO_2$/$Fe_2O_3$+$SnO_2$+$TiO_2$+$TiO_2$/$Fe_2O_3$
$Al_2O_3$ flakes+$TiO_2$/$Fe_2O_3$+$SnO_2$+$TiO_2$+$Fe_2O_3$
$Al_2O_3$ flakes+$TiO_2$/$Fe_2O_3$+$SnO_2$+$Fe_2O_3$.
$Al_2O_3$ flakes+$TiO_2$+$TiO_2$/$Fe_2O_3$+$SnO_2$+$TiO_2$/$Fe_2O_3$
$SiO_2$ flakes+$TiO_2$+$TiO_2$/$Fe_2O_3$+$SnO_2$+$TiO_2$+$TiO_2$/$Fe_2O_3$
$SiO_2$ flakes+$TiO_2$+$TiO_2$/$Fe_2O_3$+$SnO_2$+$TiO_2$+$Fe_2O_3$
$SiO_2$ flakes+$TiO_2$+$TiO_2$/$Fe_2O_3$+$SnO_2$+$Fe_2O_3$
$SiO_2$ flakes+$TiO_2$/$Fe_2O_3$+$SnO_2$+$TiO_2$/$Fe_2O_3$
$SiO_2$ flakes+$TiO_2$/$Fe_2O_3$+$SnO_2$+$TiO_2$+$TiO_2$/$Fe_2O_3$
$SiO_2$ flakes+$TiO_2$/$Fe_2O_3$+$SnO_2$+$TiO_2$+$Fe_2O_3$
$SiO_2$ flakes+$TiO_2$/$Fe_2O_3$+$SnO_2$+$Fe_2O_3$.

Instead of the above-mentioned synthetic substrates, it is also possible to employ flake-form substrates of natural origin, such as, for example, flakes of natural mica. Preferred multilayered pigments, for example on natural mica, preferably have the following layer structure:

natural mica flakes+$TiO_2$+$TiO_2$/$Fe_2O_3$+$SnO_2$+$TiO_2$/$Fe_2O_3$
natural mica flakes+$TiO_2$+$TiO_2$/$Fe_2O_3$+$SnO_2$+$TiO_2$+$TiO_2$/$Fe_2O_3$
natural mica flakes+$TiO_2$+$TiO_2$/$Fe_2O_3$+$SnO_2$+$TiO_2$+$Fe_2O_3$
natural mica flakes+$TiO_2$+$TiO_2$/$Fe_2O_3$+$SnO_2$+$Fe_2O_3$
natural mica flakes+$TiO_2$/$Fe_2O_3$+$SnO_2$+$TiO_2$/$Fe_2O_3$
natural mica flakes+$TiO_2$/$Fe_2O_3$+$SnO_2$+$TiO_2$+$TiO_2$/$Fe_2O_3$
natural mica flakes+$TiO_2$/$Fe_2O_3$+$SnO_2$+$TiO_2$+$Fe_2O_3$
natural mica flakes+$TiO_2$/$Fe_2O_3$+$SnO_2$+$Fe_2O_3$
natural mica flakes+$TiO_2$+$TiO_2$/$Fe_2O_3$+$SnO_2$+$TiO_2$+Carmine Red
natural mica flakes+$TiO_2$+$TiO_2$/$Fe_2O_3$+$SnO_2$+$TiO_2$+Berlin Blue.

The above-mentioned preferred multilayered pigments may optionally each also have a protective layer (D) as final layer.

High-refractive-index coatings in this application are taken to mean layers having a refractive index of ≥1.8, low-refractive-index layers are taken to mean those where n<1.8.

The multilayered pigments according to the invention can generally be prepared relatively easily.

In the case of wet coating, the substrate flakes are suspended in water, optionally mixed with a water-glass solution, and then with one or more hydrolysable metal salts at a pH which is suitable for hydrolysis, which is selected so that the $SiO_2$, if present, preferably in the case of the covering of glass flakes, and the metal oxide(s) or metal oxide hydrate(s) are precipitated directly onto the flake, simultaneously or successively, without secondary precipitations occurring. The pH is usually kept constant by simultaneous metered addition of a base and/or acid. The pigments are subsequently separated off, washed and dried at 50-150° C. for 6-18 h and optionally calcined for 0.5-3 h, where the calcination temperature can be optimised with respect to the coating present in each case. In general, the calcination temperatures are in the range from 600-1100 C, preferably 700-1000° C. In the case of the use of glass flakes as substrate, the calcination temperature is preferably in the range from 500-800° C. Finally, the pigment is sieved. If desired, the pigments can be separated off, dried and optionally calcined after application of individual coatings and then re-suspended again for the precipitation of the further layers.

In the case of the application of a temperature-sensitive layer, for example comprising Carmine Red or Berlin Blue, final calcination is generally omitted. In this case, it may be advantageous to work up and calcine the multilayered pigment before application of the temperature-sensitive layer and then to cover it with the temperature-sensitive layer in a separate covering process.

Besides aqueous covering, the coating of the substrates can also be carried out in a fluidised-bed reactor by gas-phase coating, it being possible to use correspondingly, for example, the methods proposed in EP 0 045 851 and EP 0 106 235 for the preparation of pearlescent pigments.

Preference is given to multilayered pigments having a gold or red hue, which can be varied in very broad limits through the different choice of the covering amounts or the layer thicknesses resulting therefrom. Fine tuning for a certain hue can be achieved beyond the pure choice of amount by approaching the desired colour under visual or measurement-technology control.

In order to increase the light, water and weather stability, it is frequently advisable to subject the finished pigment to post-coating or post-treatment, depending on the area of application. Suitable post-coatings or post-treatments are, for example, the processes described in German Patent 22 15 191, DE-A 31 51 354, DE-A 32 35 017 or DE-A 33 34 598. This post-coating/post-treatment (layer D) further increases the chemical and photochemical stability or simplifies handling of the pigment, in particular incorporation into various media. In order to improve the wettability, dispersibility and/or compatibility with the user media, it is possible to apply, for example, functional coatings comprising $Al_2O_3$ or $ZrO_2$ or mixtures thereof to the pigment surface. Furthermore, organic post-coatings are possible, for example with silanes, as described, for example, in EP 0090259, EP 0 634 459, WO 99/57204, WO 96/32446, WO 99/57204, U.S. Pat. No. 5,759,255, U.S. Pat. No. 5,571,851, WO 01/92425 or in J. J. Ponjeé, Philips Technical Review, Vol. 44, No. 3, 81 ff. and P. H. Harding J. C. Berg, J. Adhesion Sci. Technol. Vol. 11, No. 4, pp. 471-493. Layer (D) preferably has thicknesses of 0.1-100 nm, in particular 0.1-50 nm and very particularly preferably 0.1-30 nm.

In a preferred embodiment, layer (D) consists of an $SiO_2$ layer. This layer may be either calcined or non-calcined. It is preferably a calcined $SiO_2$ layer.

Since the multilayered pigments according to the invention combine high gloss with intense interference colours and an attractive powder colour, they can be used to achieve particularly effective effects in the various application media, for example in cosmetic formulations, such as, for example, nail varnishes, lipsticks, compact powders, gels, lotions, soaps, toothpastes, in surface coatings, such as, for example, automotive paints, industrial coatings and powder coatings, and in printing inks, seed colourings, plastics and in ceramics.

The concentration of the pigment according to the invention in the application system to be pigmented is generally between 0.1 and 100% by weight, preferably between 0.1 and 70% by weight and in particular between 0.5 and 10% by weight, based on the total solids content of the system. It is generally dependent on the specific application.

It goes without saying that, for the various applications, the multilayered pigments according to the invention may also advantageously be used as a mixture with one or more colorants, for example effect pigments selected from the group of the pearlescent pigments, interference pigments, goniochromatic pigments, BiOCl flakes, multilayered pigments, metal pigments, lustre pigments, and/or organic dyes, and/or organic coloured pigments and other pigments, such as, for example, transparent and opaque white, coloured and black pigments, and also with flake-form iron oxides, holographic pigments, LCPs (liquid crystal polymers) and conventional transparent, coloured and black lustre pigments based on metal oxide-coated mica flakes and $SiO_2$ flakes, etc. The multilayered pigments according to the invention can be mixed with a colorant in any ratio. The multilayered pigment according to the invention to colorant weight ratio can be 1:99 to 99:1, depending on the colour intensity.

Suitable colorants are, in particular, pearlescent pigments, in particular based on natural or synthetic mica, $SiO_2$ flakes, $Fe_2O_3$ flakes, glass flakes or $Al_2O_3$ flakes, which are covered with one or more metal-oxide layers, metal-effect pigments (Al flakes, bronzes), optically variable pigments (OVPs), liquid-crystal polymer pigments (LCPs) or holographic pigments.

Besides the effect pigments as admixture, predominantly non-lustrous, conventional colorants are also particularly suitable, such as, for example, $TiO_2$, coloured $SiO_2$, $CaSO_4$, iron oxides, chromium oxides, carbon black, organic coloured pigments, such as, for example, anthraquinone pigments, quinacridone pigments, diketopyrrolopyrrole pigments, phthalocyanine pigments, azo pigments, isoindoline pigments. Also suitable are, for example, BiOCl pigments, coloured glass fibres, α-FeOOH, organic coloured pigments, such as, for example, azo pigments, β-phthalocyanine CI Blue 15.3, Cromophtal Yellow 8GN (Ciba-Geigy), Irgalith Blue PD56 (BASF), azomethine/copper complex CI Yellow 129, Irgazine Yellow 5GT (BASF) or a mixture of the said colorants. The colorants here may be both of natural or also synthetic origin.

The multilayered pigments according to the invention can of course also be mixed or employed with fillers in any weight ratio. Fillers which may be mentioned are, for example, synthetic organic polymers, polymethyl methacrylate, methyl methacrylate crosspolymer, natural and synthetic mica, nylon powder, pure or filled melamine resins, talc, $SiO_2$, glass powder, glass beads, kaolin, oxides or hydroxides of aluminium, magnesium, calcium, zinc, BiOCl, barium sulfate, calcium sulfate, calcium carbonate, magnesium carbonate, basic alkaline-earth metal carbonates, such as, for example, calcium carbonate or magnesium carbonate, carbon, and physical or chemical combinations of these substances. There are no restrictions regarding the particle shape of the fillers. In accordance with requirements, it can be, for example, irregular, flake-form, spherical or needle-shaped.

Finely divided, in particular nanoscale dielectrics may likewise be admixed with the multilayered pigments, in particular in cosmetic formulations, in order to improve the skin feel. Examples of additions of this type are $Al_2O_3$, $SiO_2$, ZnO or $TiO_2$, which are usually added to the formulation in amounts of 0.01-15% by weight.

The multilayered pigments according to the invention are compatible with a multiplicity of colour systems, preferably from the area of paints, surface coatings and printing inks. For the preparation of printing inks for, for example, gravure printing, flexographic printing, offset printing, offset overprint varnishing, a multiplicity of binders, in particular water-soluble grades, is suitable, as marketed, for example, by BASF, Marabu, Pröll, Sericol, Hartmann, Gebr. Schmidt, Sicpa, Aarberg, Siegberg, GSB-Wahl, Follmann, Ruco or Coates Screen INKS GmbH. The printing inks can be water-based or solvent-based. Furthermore, the multilayered pigments according to the invention are also suitable for the laser marking of paper and plastics, and for applications in the agricultural sector, for example for greenhouse sheeting, and, for example, for colouring tarpaulins.

In the case of pigmenting of binder systems, for example for surface coatings and printing inks for gravure printing, offset printing or screen printing, or as precursors for printing inks, the use of the multilayered pigments according to the invention in the form of highly pigmented pastes, granules, pellets, etc., has proven particularly suitable. The pigment according to the invention is generally incorporated into the printing ink in amounts of 2-35% by weight, preferably 5-25% by weight and in particular 8-20% by weight. Offset printing inks can comprise the pigments with a proportion of up to 40% by weight or more. The precursors of printing inks, for example in the form of granules, as pellets, briquettes, etc., comprise up to 98% by weight of the pigment according to the invention besides the binder and the additives. Printing inks which comprise the multilayered pigment according to the invention generally exhibit purer hues than printing inks comprising conventional effect pigments.

The multilayered pigments according to the invention are furthermore suitable for the preparation of flowable pigment compositions and dry preparations, in particular for printing inks, comprising one or more pigments according to the invention, binders and optionally one or more additives.

In plastics comprising the multilayered pigment according to the invention, preferably in amounts of 0.01 to 50% by weight, in particular 0.1 to 7% by weight, particularly pronounced colour effects can be achieved.

In the surface coatings area, in particular in automobile paints, the multilayered pigment is employed in amounts of 0.1-20% by weight, preferably 1 to 10% by weight, including for 3-coat systems. Decorative painting of automobiles is typically carried out in 2 coats: firstly, a decorative coat, i.e. comprising the colour-determining pigments, is sprayed onto the primer. This is followed by painting with a clear coat, which enhances the colour and increases the gloss. In addition, the clear coat makes a crucial contribution to the weather stability and durability of the finish.

Furthermore, the pigment according to the invention can be employed for the finishing of foods, for example mass colouring and/or coatings of boiled sweets, wine gums, such as, for example, jelly babies, pralines, liquorice, confectionery, sticks of rock, blancmange, fizzy drinks, sodas, etc., or as a coating, for example, in dragees and tablets in the pharmaceuticals area.

The multilayered pigment according to the invention can also advantageously be employed in decorative and care cosmetics. The use concentration extends from 0.01% by weight in shampoo to 100% by weight in the case of loose powders. In the case of a mixture of the pigments according to the invention with fillers, preferably with spherical fillers, such as, for example, $SiO_2$, the concentration in the cosmetic formulation can be 0.01-70% by weight. The cosmetic products, such as, for example, nail varnishes, compact powders, shampoos, loose powders and gels, are distinguished by particularly interesting colour effects and high gloss.

No limits are set for the concentrations of the multilayered pigments according to the invention in the formulation. They can be—depending on the application—between 0.001 (rinse-off products, for example shower gels) and 100% (for example lustre-effect articles for particular applications).

Owing to the good skin feeling and the very good skin adhesion, the pigments according to the invention are suitable both for personal care applications, such as, for example, body lotions, emulsions, shampoos, soaps, etc., and also, in particular, for decorative cosmetics.

The multilayered pigments according to the invention can of course also be combined in the formulations with any type of raw materials and assistants and active compounds. These include, inter alia, water, alcohols, polyols, polar and non-polar oils, fats, waxes, film formers, polymers, copolymers, surfactants, free-radical scavengers, antioxidants, such as, for example, vitamin C or vitamin E, stabilisers, odour enhancers, silicone oils, emulsifiers, fragrances, solvents, such as, for example, ethanol, ethyl acetate or butyl acetate, preservatives and assistants which generally determine the applicational properties, such as, for example, thickeners and rheological additives, such as, for example, bentonites, hectorites, silicon dioxides, Ca silicates, gelatine, high-molecular-weight carbohydrates and/or surface-active assistants, etc.

Suitable active compounds are, for example, insect repellents, inorganic UV filters, such as, for example, $TiO_2$, UV A/BC protection filters (for example OMC, B3, MBC), including in encapsulated form, anti-ageing active compounds, vitamins and derivatives thereof (for example vitamin A, C, E, etc.), self-tanning agents (for example DHA, erythrulose, inter alia) and further cosmetic active compounds, such as, for example, bisabolol, LPO, VTA, ectoin, emblica, allantoin, bioflavonoids and derivatives thereof.

Organic UV filters are generally incorporated into cosmetic formulations in an amount of 0.5 to 10% by weight, preferably 1 to 8% by weight, and inorganic filters in an amount of 0.1 to 30% by weight.

The multilayered pigments according to the invention can be used, for example, in lipsticks, lip gloss, rouge, eyeliner, eye shadow, (volume) mascara, nail varnishes, day creams, night creams, body lotions, cleansing milk, body powders, hair gels, hair masks, hair rinses, hair shampoos, shower gels, shower oils, bath oils, sunscreen, pre-sun and after-sun preparations, tanning lotions, tanning sprays, make-ups, lotions, soaps, bath salts, toothpaste, face masks, compact powders, loose powders and gels, etc. Products of this type are produced in a manner as is known to the person skilled in the art in this area.

The invention relates, in particular, to formulations which, besides the multilayered pigment according to the invention, comprise at least one constituent selected from the group of the absorbents, astringents, antimicrobial substances, antioxidants, antiperspirants, antifoaming agents, antidandruff active compounds, antistatics, binders, biological additives, bleaches, chelating agents, deodorisers, emollients, emulsifiers, emulsion stabilisers, dyes, humectants, film formers, fillers, fragrances, flavours, insect repellents, preservatives, anticorrosion agents, cosmetic oils, solvents, oxidants, vegetable constituents, buffer substances, reducing agents, surfactants, propellant gases, opacifiers, UV filters and UV absorbers, denaturing agents, viscosity regulators, perfume and vitamins.

The invention furthermore also relates to the use of the pigments in formulations, such as paints, surface coatings, industrial coatings, coil coating, automobile paints, automotive refinish paints, powder coatings, printing inks, security printing inks, plastics, ceramic materials, glasses, paper, in toners for electrophotographic printing processes, in seed, in greenhouse sheeting and tarpaulins, as absorbers in the laser marking of paper and plastics, in cosmetic formulations, for the preparation of pigment pastes with water, organic and/or aqueous solvents, for the preparation of pigment compositions and dry preparations, such as, for example, granules, pellets, chips, briquettes, for the mass colouring of foods, for the colouring of coatings of food products and pharmaceutical products, for example as coating in the case of dragees and tablets.

Particular preference is given to the use of the multilayered pigments according to the invention in surface coatings, such as, for example, automobile paints, automotive refinish paints and industrial coatings, powder coatings, coil coating and in printing inks.

The following examples are intended to explain the invention in greater detail, but without restricting it.

EXAMPLES

Example 1: $Al_2O_3$ Flake+$TiO_2$/$Fe_2O_3$+$SnO_2$+$TiO_2$/$Fe_2O_3$ 100 g of $Al_2O_3$ flakes of particle size 5-40 µm are heated to 75° C. in 1.5 l of demineralised water. When this temperature has been reached, 460 g of a mixed solution of 167 g of $TiCl_4$ solution (30% by weight of $TiCl_4$), 222 g of $FeCl_3$ solution (14% of Fe), 6.6 g of $AlCl_3 \times 6\ H_2O$ and 111 g of demineralised water are slowly metered in with vigorous stirring. The pH is kept constant at pH 2.6 using 32% sodium hydroxide solution. After addition of this solution, the pH is lowered to pH=1.8 using hydrochloric acid (18% of HCl), and 805 g of an $SnCl_4$ solution (2% by weight of $SnCl_4$) stabilised with concentrated hydrochloric acid are metered in at this pH over the course of 300 minutes. The pH is then raised to 2.6 using 32% sodium hydroxide solution, and 835 g of a mixed solution of 306 g of $TiCl_4$ solution (30% by weight of $TiCl_4$), 399 g of $FeCl_3$ solution (14% of Fe), 11.8 g of $AlCl_3 \times 6\ H_2O$ and 224 g of demineralised water are slowly metered in. During this operation, the pH is kept constant using 32% sodium hydroxide solution. The pH is subsequently raised to pH=5.0 using 32% sodium hydroxide solution, and the mixture is stirred for a further 15 minutes. The pigment is filtered off, washed with demineralised water and dried at 110° C. for 16 h. 15 g of the product are calcined at 820° C. for 30 min., giving a slightly greenish gold pigment having an intense colour, high hiding power and strong lustre.

Example 2: $Al_2O_3$ Flake+$TiO_2$/$Fe_2O_3$+$SnO_2$+$TiO_2$/$Fe_2O_3$ 100 g of $Al_2O_3$ flakes of particle size 5-40 µm are heated to 75° C. in 1.5 l of demineralised water. When this temperature has been reached, 460 g of a mixed solution of 167 g of $TiCl_4$ solution (30% by weight of $TiCl_4$), 222 g of $FeCl_3$ solution (14% of Fe), 6.6 g of $AlCl_3\times6$ $H_2O$ and 101 g of demineralised water are slowly metered in with vigorous stirring. The pH is kept constant at pH 2.6 using 32% sodium hydroxide solution. After addition of this solution, the pH is lowered to pH=1.8 using hydrochloric acid (18% of HCl), and 805 g of an $SnCl_4$ solution (2% by weight of $SnCl_4$) stabilised with concentrated hydrochloric acid are metered in at this pH over the course of 300 minutes. The pH is then raised to 2.6 using 32% sodium hydroxide solution, and 760 g of a mixed solution of 306 g of $TiCl_4$ solution (30% by weight of $TiCl_4$), 399 g of $FeCl_3$ solution (14% of Fe), 11.8 g of $AlCl_3\times6$ $H_2O$ and 224 g of demineralised water are slowly metered in. During this operation, the pH is kept constant using 32% sodium hydroxide solution. The pH is subsequently raised to pH=5.0 using 32% sodium hydroxide solution, and the mixture is stirred for a further 15 minutes. The pigment is filtered off, washed with demineralised water and dried at 110° C. for 16 h. 15 g of the product are calcined at 850° C. for 30 min., giving a strongly greenish gold pigment having an intense colour, high hiding power and strong lustre.

Example 3: Glass Flake+$SiO_2$+$TiO_2$/$Fe_2O_3$+$SnO_2$+$TiO_2$/$Fe_2O_3$ 150 g of calcium aluminium borosilicate flakes of particle size 20-200 µm are heated to 75° C. in 1.5 l of demineralised water. When this temperature has been reached, the pH is adjusted to pH 9.0, and 110.8 g of $Na_2SiO_3$ solution (13.75% of $SiO_2$) are metered in over the course of 50 minutes with vigorous stirring. During this operation, the pH is kept constant using hydrochloric acid (18% of HCl). The pH is then lowered to 2.6, and 250 g of a mixture of 197 g of $FeCl_3$ solution (14.2% of Fe), 148 g of $TiCl_4$ solution (32% of $TiCl_4$) and 6.1 g of $AlCl_3$ solution (29% of $AlCl_3$) are metered in over the course of 60 minutes. The pH is subsequently lowered 1.8, and a mixture of 25.9 g of $SnCl_4$ solution, 66 g of hydrochloric acid (37% of HCl) and 500 g of DI water is metered in over the course of 200 min. The pH is subsequently raised to 2.6 again, and 285 ml of a mixture of 197 g of $FeCl_3$ solution (14.2% of Fe), 148 g of $TiCl_4$ solution (32% of $TiCl_4$) and 6.1 g of $AlCl_3$ solution (29% of $AlCl_3$) are metered in over the course of 350 minutes. The pH is in each case kept constant using sodium hydroxide solution (32%). The pH is subsequently raised to pH=5.0 using 32% sodium hydroxide solution, and the mixture is stirred for a further 15 minutes. The pigment is filtered off, washed with demineralised water and dried at 110° C. for 16 h. 15 g of the product are calcined at 650° C. for 30 min., giving a gold pigment having an intense colour and strong glitter effect.

Example 4: $SiO_2$ Flake+$TiO_2$/$Fe_2O_3$+$SnO_2$+$TiO_2$/$Fe_2O_3$ 100 g of $SiO_2$ flakes of particle size 10-60 µm are heated to 75° C. in 2 l of demineralised water. When this temperature has been reached, 415 g of a mixed solution of 178 g of $TiCl_4$ solution (30% by weight of $TiCl_4$), 237 g of $FeCl_3$ solution (14% of Fe), 7.0 g of $AlCl_3\times6$ $H_2O$ and 117 g of demineralised water are slowly metered in with vigorous stirring. The pH is kept constant at pH 2.6 using 32% sodium hydroxide solution. After addition of this solution, the pH is lowered to pH=1.8 using hydrochloric acid (18% of HCl), and 750 g of an $SnCl_4$ solution (2 w.-% of $SnCl_4$) stabilised with concentrated hydrochloric acid are metered in at this pH over the course of 300 minutes. The pH is then raised to 2.6 using 32% sodium hydroxide solution, and 660 g of a mixed solution of 218 g of $TiCl_4$ solution (30% by weight of $TiCl_4$), 289 g of $FeCl_3$ solution (14% of Fe), 8.6 g of $AlCl_3\times6$ $H_2O$ and 145 g of demineralised water are slowly metered in. During this operation, the pH is kept constant using 32% sodium hydroxide solution. The pH is subsequently raised to pH=5.0 using 32% sodium hydroxide solution, and the mixture is stirred for a further 15 minutes.

The pigment is filtered off, washed with demineralised water and dried at 110° C. for 16 h. 15 g of the product are calcined at 850° C. for 30 min., giving a gold pigment having an intense colour and strong lustre.

Example 5: Mica Flake+$TiO_2$+$TiO_2$/$Fe_2O_3$+$SnO_2$+$TiO_2$/$Fe_2O_3$ 100 g of mica flakes (thickness: 100-500 nm, $D_{50}$=15-30 µm) are heated to 75° C. in 1.5 l of demineralised water. When this temperature has been reached, the pH is adjusted to pH 2.2 using hydrochloric acid (18% of HCl), and 22 g of $TiCl_4$ solution (32% of $TiCl_4$) are metered in over the course of 20 minutes with vigorous stirring. During this operation, the pH is kept constant using hydrochloric acid (18% of HCl). The pH is then increased to 2.6 using sodium hydroxide solution (32% of NaOH), and 552 g of a mixture of 236 g of $FeCl_3$ solution (14.2% of Fe), 178 g of $TiCl_4$ solution (32% of $TiCl_4$) and 7.3 g of $AlCl_3$ solution (29% of $AlCl_3$) are metered in over the course of 250 min. The pH is subsequently lowered 1.8, and a mixture of 34.6 g of $SnCl_4$ solution (50% of $SnCl_4$), 90 g of hydrochloric acid (37% of HCl) and 680 g of DI water is metered in over the course of 200 minutes. The pH is subsequently raised to 2.6 again using hydrochloric acid (18% of HCl), and 342 ml of a mixture of 236 g of $FeCl_3$ solution (14.2% of Fe), 178 g of $TiCl_4$ solution (32% of $TiCl_4$) and 7.3 g of $AlCl_3$ solution (29% of $AlCl_3$) are metered in over the course of 160 min. The pH is in each case kept constant using sodium hydroxide solution (32%). The pH is subsequently raised to pH=5.0 using 32% sodium hydroxide solution, and the mixture is stirred for a further 15 minutes. The pigment is filtered off, washed with demineralised water and dried at 110° C. for 16 h. 15 g of the product are calcined at 820° C. for 30 min., giving a gold pigment having an intense colour and strong glitter effect.

Comparative Example

Analogously to Example 1 of CN 101289580A), 100 g of synthetic mica are coated with $TiO_2$+$Fe_2O_3$/$TiO_2$+$SnO_2$+$TiO_2$.

100 g of fluorophlogopite flakes of particle size 10-40 µm are heated to 85° C. in 1.6 l of demineralised water. When this temperature has been reached, the pH is lowered to 2.3 using hydrochloric acid (18 w.-% of HCl), and 541.4 g of a 32% $TiCl_4$ solution are metered in over the course of 290 min. with vigorous stirring. During this operation, the pH is kept constant using sodium hydroxide solution (20 w.-%).

The pH is subsequently raised to 4.0 using sodium hydroxide solution, and a mixture of 172 g of $FeCl_3$ solution (14.2% of Fe) 34.9 g of $TiCl_4$ solution (32% of $TiCl_4$) and 118 g of DI water is metered in over the course of 75 min.

The pH is kept constant at pH 4.0 using 20% sodium hydroxide solution. The pH is subsequently lowered to pH=1.2 using hydrochloric acid (18% of HCl) and then raised to pH 1.5 using sodium hydroxide solution (20%). At this pH, a solution of 32.1 g of $SnCl_4$ (50 w.-% of $SnCl_4$) and 82.4 g of hydrochloric acid (32% of HCl) in 622.4 g of DI water is metered in over the course of 240 minutes. The pH is then raised to 2.3 using 32% sodium hydroxide solution, and 482 g of $TiCl_4$ solution (32% of $TiCl_4$) are metered in over the course of 300 minutes. During this operation, the pH is kept constant using 32% sodium hydroxide solution. The pH is subsequently raised to pH=5 using 32% sodium hydroxide solution, and the mixture is stirred for a further 15 minutes.

The product is filtered off, washed with DI water and dried at 110° C. for 10 h. 15 g of the product is calcined at 820° C. for 0.5 h, giving a bronze-coloured powder.

Colour Measurements:

The following table shows the Lab values determined by colour measurement and the C* values (CIE-L*a*b* standard colour value system). The C* value is a direct measure of the chroma. The measurements are carried out using an ETA photometer (manufacturer: STEAG ETA-OPTIK GmbH).

TABLE 1

| | Pigment | | | |
| --- | --- | --- | --- | --- |
| | 75°/95° black background | | | Chroma |
| | L* | a* | b* | C* |
| Example 1 | 142.9 | −2.0 | 117.0 | 117.0 |
| Example 2 | 144.5 | −16.8 | 104.6 | 105.9 |
| Comparative Example (CN 101289580 A) | 131.1 | 15.9 | 49.8 | 52.3 |

The pigments according to the invention in accordance with Examples 1 and 2 exhibit significantly higher C* values compared with the comparative example.

USE EXAMPLES

Example A1: Automobile Paint

The pigment powders can easily be incorporated into automobile paints. To this end, the pigment is added to the paint base with stirring. The stirring operation is continued until the pigment has uniformly distributed in the paint. The coloured paint is sprayed onto black- and white-coated aluminium test sheets.
Production of the Paint Sheets:
Paint: Herberts 419982 base coat
Pigmentation: 5% of the pigment from Example 1
Dry layer thickness: 15 μm
Spray gun: Sprimag S 233, nozzle diameter 1.5 mm
Spray pressure: 4 bar
Nozzle-substrate separation: 27 cm Example A2: Flexographic Printing Preparation of the Printing Ink:

The multilayered pigment from Example 4 is pre-wetted with Byk 348 pre-wetting (0.6%) and incorporated into the binder in a concentration of 22.9%.
Binder: Koustom Kote 9000/USA, water-based
The paste is diluted with water until a viscosity of 40 sec with the 4 mm Erichsen cup at 25° C. reached.

The pigments are printed onto matt-black art printing paper using a ceramic anilox cylinder (24 ccm/m$^2$) via a rubber printing plate.

The pigments according to the invention exhibit a very strong colour and glitter effect.

Example A3: Screen Printing

The pigment concentration can be varied greatly here depending on the desired effect.

Suitable binders are both aqueous and also solvent-containing systems. For areas exposed to daylight, the addition of a UV protection, such as, for example, benzotriazoles or HALS, is advisable in order to increase the durability of the coating.

The screen printing fabric is selected depending on the particle size of the pigment employed. Thus, for example, for the pigment particle fraction of 5-40 μm, a screen mesh width of 61-64 has proven successful (wires/cm—wire diameter).

Suitable substrates are a large selection of surfaces—the most important materials are fabrics, films, cardboard and papers or wallpapers.

Use Example

15% of pigment from Example 1
"Binder": Pröll Aqua Jet FGL M 093:85%
Screen fabric 61-64
Optionally dilution with water
Laboratory experiment: 50-150 g of ink
Substrate: Luxo Satin 250 g/m$^2$ (manufacturer "Papyrus").

Example A4: Automobile Paint

The pigment powders can easily be incorporated into automobile paints. To this end, the pigment is added to the paint base with stirring. The stirring operation is continued until the pigment has uniformly distributed in the paint. The coloured paint is sprayed onto black- and white-coated aluminium test sheets.
Production of the Paint Sheets:
Paint: Herberts 419982 base coat
Pigmentation: 5% of the pigment from Example 5
Dry layer thickness: 15 μm
Spray gun: Sprimag S 233, nozzle diameter 1.5 mm
Spray pressure: 4 bar
Nozzle-substrate separation: 27 cm

The invention claimed is:

1. An interference pigment comprising a flake-form substrate and on the surface of the substrate a coating having a layer sequence consisting of:
   (A0) optionally a high-refractive-index coating consisting of a layer of $TiO_2$,
   (A) a high-refractive-index coating consisting of a mixture of $TiO_2$ and $Fe_2O_3$, which may optionally be doped with one or more further oxides,
   (B) a high-refractive-index layer consisting of $SnO_2$,
   (C) a high-refractive-index coating which absorbs in the visible wavelength region,
   and optionally
   (D) an outer protective layer.

2. Interference pigment according to claim 1, wherein the flake form substrate is of natural or synthetic mica, glass flakes, $Al_2O_3$ flakes, $SiO_2$ flakes or $TiO_2$ flakes or flake-form materials coated with metal oxides.

3. Interference pigment according to claim 1, wherein the flake form substrate is of mica flakes, glass flakes or $Al_2O_3$ flakes.

4. Interference pigment according to claim 1, wherein the flake form substrate is of $SiO_2$-coated glass flakes.

5. Interference pigment according to claim 1, wherein coating (A) is doped with one or more oxides selected from $Al_2O_3$, $Ce_2O_3$, $B_2O_3$, $ZrO_2$, and $SnO_2$.

6. Interference pigment according to claim 1, wherein coating (C) is
    a $TiO_2$ layer followed by an $Fe_2O_3$ layer, or
    an $Fe_2O_3$ layer, or
    a layer consisting of a mixture of $TiO_2$ and $Fe_2O_3$, or
    a $TiO_2$ layer followed by a layer of Carmine Red, or
    a $TiO_2$ layer followed by a layer of Berlin Blue.

7. Interference pigment according to claim 1, wherein the pigment has the following layer sequence on the substrate:
    substrate+$TiO_2$+$TiO_2/Fe_2O_3$+$SnO_2$+$TiO_2/Fe_2O_3$
    substrate+$TiO_2$+$TiO_2/Fe_2O_3$+$SnO_2$+$TiO_2$+$TiO_2/Fe_2O_3$
    substrate+$TiO_2$+$TiO_2/Fe_2O_3$+$SnO_2$+$TiO_2$+$Fe_2O_3$
    substrate+$TiO_2$+$TiO_2/Fe_2O_3$+$SnO_2$+$Fe_2O_3$
    substrate+$TiO_2$+$TiO_2/Fe_2O_3$+$SnO_2$+$Fe_3O_4$
    substrate+$TiO_2$+$TiO_2/Fe_2O_3$+$SnO_2$+$TiO_2$+Carmine Red
    substrate+$TiO_2$+$TiO_2/Fe_2O_3$+$SnO_2$+$TiO_2$+Berlin Blue
    substrate+$TiO_2/Fe_2O_3$+$SnO_2$+$TiO_2/Fe_2O_3$
    substrate+$TiO_2/Fe_2O_3$+$SnO_2$+$TiO_2$+$TiO_2/Fe_2O_3$
    substrate+$TiO_2/Fe_2O_3$+$SnO_2$+$TiO_2$+$Fe_2O_3$
    substrate+$TiO_2/Fe_2O_3$+$SnO_2$+$Fe_2O_3$
    substrate+$TiO_2/Fe_2O_3$+$SnO_2$+$Fe_3O_4$
    substrate+$TiO_2/Fe_2O_3$+$SnO_2$+$TiO_2$+Carmine Red or
    substrate+$TiO_2/Fe_2O_3$+$SnO_2$+$TiO_2$+Berlin Blue.

8. Interference pigment according to claim 1, wherein pigment has the following structure:
    synthetic mica flakes+$TiO_2$+$TiO_2/Fe_2O_3$+$SnO_2$+$TiO_2/Fe_2O_3$
    synthetic mica flakes+$TiO_2$+$TiO_2/Fe_2O_3$+$SnO_2$+$TiO_2$+$TiO_2/Fe_2O_3$
    synthetic mica flakes+$TiO_2$+$TiO_2/Fe_2O_3$+$SnO_2$+$TiO_2$+$Fe_2O_3$
    synthetic mica flakes+$TiO_2$+$TiO_2/Fe_2O_3$+$SnO_2$+$Fe_2O_3$
    synthetic mica flakes+$TiO_2/Fe_2O_3$+$SnO_2$+$TiO_2/Fe_2O_3$
    synthetic mica flakes+$TiO_2/Fe_2O_3$+$SnO_2$+$TiO_2$+$TiO_2/Fe_2O_3$
    synthetic mica flakes+$TiO_2/Fe_2O_3$+$SnO_2$+$TiO_2$+$Fe_2O_3$
    synthetic mica flakes+$TiO_2/Fe_2O_3$+$SnO_2$+$Fe_2O_3$
    glass flakes+$TiO_2$+$TiO_2/Fe_2O_3$+$SnO_2$+$TiO_2/Fe_2O_3$
    glass flakes+$TiO_2$+$TiO_2/Fe_2O_3$+$SnO_2$+$TiO_2$+$TiO_2/Fe_2O_3$
    glass flakes+$TiO_2$+$TiO_2/Fe_2O_3$+$SnO_2$+$TiO_2$+$Fe_2O_3$
    glass flakes+$TiO_2$+$TiO_2/Fe_2O_3$+$SnO_2$+$Fe_2O_3$
    glass flakes+$TiO_2/Fe_2O_3$+$SnO_2$+$TiO_2/Fe_2O_3$
    glass flakes+$TiO_2/Fe_2O_3$+$SnO_2$+$TiO_2$+$TiO_2/Fe_2O_3$
    glass flakes+$TiO_2/Fe_2O_3$+$SnO_2$+$TiO_2$+$Fe_2O_3$
    glass flakes+$TiO_2/Fe_2O_3$+$SnO_2$+$Fe_2O_3$
    glass flakes+$SiO_2$+$TiO_2$+$TiO_2/Fe_2O_3$+$SnO_2$+$TiO_2/Fe_2O_3$
    glass flakes+$SiO_2$+$TiO_2$+$TiO_2/Fe_2O_3$+$SnO_2$+$TiO_2$+$TiO_2/Fe_2O_3$
    glass flakes+$SiO_2$+$TiO_2$+$TiO_2/Fe_2O_3$+$SnO_2$+$TiO_2$+$Fe_2O_3$
    glass flakes+$SiO_2$+$TiO_2$+$TiO_2/Fe_2O_3$+$SnO_2$+$Fe_2O_3$
    glass flakes+$SiO_2$+$TiO_2/Fe_2O_3$+$SnO_2$+$TiO_2/Fe_2O_3$
    glass flakes+$SiO_2$+$TiO_2/Fe_2O_3$+$SnO_2$+$TiO_2$+$TiO_2/Fe_2O_3$
    glass flakes+$SiO_2$+$TiO_2/Fe_2O_3$+$SnO_2$+$TiO_2$+$Fe_2O_3$
    glass flakes+$SiO_2$+$TiO_2/Fe_2O_3$+$SnO_2$+$Fe_2O_3$
    $Al_2O_3$ flakes+$TiO_2$+$TiO_2/Fe_2O_3$+$SnO_2$+$TiO_2/Fe_2O_3$
    $Al_2O_3$ flakes+$TiO_2$+$TiO_2/Fe_2O_3$+$SnO_2$+$TiO_2$+$TiO_2/Fe_2O_3$
    $Al_2O_3$ flakes+$TiO_2$+$TiO_2/Fe_2O_3$+$SnO_2$+$TiO_2$+$Fe_2O_3$
    $Al_2O_3$ flakes+$TiO_2$+$TiO_2/Fe_2O_3$+$SnO_2$+$Fe_2O_3$
    $Al_2O_3$ flakes+$TiO_2/Fe_2O_3$+$SnO_2$+$TiO_2/Fe_2O_3$
    $Al_2O_3$ flakes+$TiO_2/Fe_2O_3$+$SnO_2$+$TiO_2$+$TiO_2/Fe_2O_3$
    $Al_2O_3$ flakes+$TiO_2/Fe_2O_3$+$SnO_2$+$TiO_2$+$Fe_2O_3$
    $Al_2O_3$ flakes+$TiO_2/Fe_2O_3$+$SnO_2$+$Fe_2O_3$
    $SiO_2$ flakes+$TiO_2$+$TiO_2/Fe_2O_3$+$SnO_2$+$TiO_2$+$TiO_2/Fe_2O_3$
    $SiO_2$ flakes+$TiO_2$+$TiO_2/Fe_2O_3$+$SnO_2$+$TiO_2$+$Fe_2O_3$
    $SiO_2$ flakes+$TiO_2$+$TiO_2/Fe_2O_3$+$SnO_2$+$Fe_2O_3$
    $SiO_2$ flakes+$TiO_2/Fe_2O_3$+$SnO_2$+$TiO_2/Fe_2O_3$
    $SiO_2$ flakes+$TiO_2/Fe_2O_3$+$SnO_2$+$TiO_2$+$TiO_2/Fe_2O_3$
    $SiO_2$ flakes+$TiO_2/Fe_2O_3$+$SnO_2$+$TiO_2$+$Fe_2O_3$
    $SiO_2$ flakes+$TiO_2/Fe_2O_3$+$SnO_2$+$Fe_2O_3$
    natural mica flakes+$TiO_2$+$TiO_2/Fe_2O_3$+$SnO_2$+$TiO_2/Fe_2O_3$
    natural mica flakes+$TiO_2$+$TiO_2/Fe_2O_3$+$SnO_2$+$TiO_2$+$TiO_2/Fe_2O_3$
    natural mica flakes+$TiO_2$+$TiO_2/Fe_2O_3$+$SnO_2$+$TiO_2$+$Fe_2O_3$
    natural mica flakes+$TiO_2$+$TiO_2/Fe_2O_3$+$SnO_2$+$Fe_2O_3$
    natural mica flakes+$TiO_2/Fe_2O_3$+$SnO_2$+$TiO_2/Fe_2O_3$
    natural mica flakes+$TiO_2/Fe_2O_3$+$SnO_2$+$TiO_2$+$TiO_2/Fe_2O_3$
    natural mica flakes+$TiO_2/Fe_2O_3$+$SnO_2$+$TiO_2$+$Fe_2O_3$ or
    natural mica flakes+$TiO_2/Fe_2O_3$+$SnO_2$+$Fe_2O_3$.

9. Interference pigment according to claim 7, wherein the interference pigment additionally has an outer protective layer (D).

10. Interference pigment according to claim 1, wherein the thickness of all layers (A0)-(C) together on the substrate is ≤300 nm.

11. Process for the preparation of an interference pigment according to claim 1, comprising applying metal oxides corresponding to the layers to the flake-form substrate by wet-chemical methods, by hydrolytic decomposition of metal salts in aqueous medium or by gas-phase coating in a fluidised-bed reactor.

12. A composition selected from the group consisting of compositions for: paints, coatings, industrial coatings, coil coating, automobile paints, automotive refinish paints, powder coatings, printing inks, security printing inks, plastics, ceramic materials, cosmetic formulations, glasses, paper, toners for electrophotographic printing processes, seed, greenhouse sheeting and tarpaulins, absorbers in the laser marking of paper and plastics, cosmetic formulations, the preparation of pigment pastes with water, organic and/or aqueous solvents, the preparation of pigment preparations and dry preparations, the mass colouring of foods, the colouring of coatings of food products and pharmaceutical products; which comprises a interference pigment according to claim 1.

13. Formulations comprising one or more interference pigments according to claim 1.

14. Pigment preparations comprising one or more binders and or more interference pigments according to claim 1.

15. Dry preparations comprising interference pigments according to claim 1.

* * * * *